(12) United States Patent
Wu et al.

(10) Patent No.: US 12,017,539 B2
(45) Date of Patent: Jun. 25, 2024

(54) VOLTAGE CONTROL METHOD AND APPARATUS, SYSTEM, AND MAGLEV TRAIN

(71) Applicant: CRRC QINGDAO SIFANG CO., LTD., Shandong (CN)

(72) Inventors: Donghua Wu, Shandong (CN); Yanxiao Lei, Shandong (CN); Zhiqiang Zhang, Shandong (CN); Yunfei Wang, Shandong (CN); Xinmai Gao, Shandong (CN)

(73) Assignee: CRRC QINGDAO SIFANG CO., LTD., Shandong (CN)

( * ) Notice: Subject to any disclaimer, the term of this patent is extended or adjusted under 35 U.S.C. 154(b) by 0 days.

(21) Appl. No.: 18/031,897

(22) PCT Filed: May 24, 2021

(86) PCT No.: PCT/CN2021/095375
§ 371 (c)(1),
(2) Date: Apr. 14, 2023

(87) PCT Pub. No.: WO2022/077909
PCT Pub. Date: Apr. 21, 2022

(65) Prior Publication Data
US 2023/0382235 A1 Nov. 30, 2023

(30) Foreign Application Priority Data
Oct. 14, 2020 (CN) .......................... 202011096586.8

(51) Int. Cl.
*B60L 13/10* (2006.01)
*B61C 17/00* (2006.01)

(52) U.S. Cl.
CPC .............. *B60L 13/10* (2013.01); *B61C 17/00* (2013.01)

(58) Field of Classification Search
CPC .. B60L 13/10; B60L 2200/26; B60L 2210/20; B60L 2240/12; B60L 2240/527;
(Continued)

(56) References Cited

U.S. PATENT DOCUMENTS 4,697,130 A * 9/1987 Dadpey ..................... H02P 3/18
318/762
4,777,420 A * 10/1988 Dadpey ................... H02P 23/20
318/762
(Continued)

FOREIGN PATENT DOCUMENTS

CN 1847046 A 10/2006
CN 101388631 A 3/2009
(Continued)

OTHER PUBLICATIONS

The Japanese 1st Office Action issued on Oct. 5, 2023 for JP2023-523026.
(Continued)

*Primary Examiner* — Tyler J Lee
(74) *Attorney, Agent, or Firm* — Yue (Robert) Xu; Apex Attorneys at Law LLP

(57) ABSTRACT

A voltage control method. A train traveling speed can be acquired; a target transformation ratio corresponding to the train traveling speed is determined according to correspondences between train traveling speeds and transformation ratios, the transformation ratio being a ratio of an input voltage to an output voltage; an input voltage is then transformed according to the target transformation ratio to obtain an output voltage, the output voltage being used for driving a train to travel. The correspondences between train traveling speeds and transformation ratios are obtained according to correspondences between train traveling speeds and train traction forces at different transformation ratios. By means of the method, the most suitable transformation ratio (Continued)

can be provided according to a traveling speed of a maglev train, thereby increasing the traction force of the maglev train and improving running efficiency.

11 Claims, 3 Drawing Sheets

(58) Field of Classification Search
CPC . B60L 9/16; B61B 13/08; B61C 17/00; B61L 15/0058; B61L 2205/04; B61L 2210/04; Y02T 10/72
See application file for complete search history.

(56) References Cited

U.S. PATENT DOCUMENTS

| | | | |
|---|---|---|---|
| 10,686,385 B2* | 6/2020 | Brown | H02J 7/00 |
| 10,840,807 B2* | 11/2020 | Schumacher | F25B 49/025 |
| 2003/0206421 A1* | 11/2003 | Suh | H02M 3/33507 |
| | | | 363/21.01 |
| 2004/0149953 A1 | 8/2004 | Ulicny et al. | |
| 2005/0088135 A1 | 4/2005 | Sato | |
| 2006/0238149 A1 | 10/2006 | Engel et al. | |
| 2006/0266889 A1* | 11/2006 | Franke | B61L 1/185 |
| | | | 246/34 R |
| 2012/0140531 A1* | 6/2012 | Lin | H02M 3/33507 |
| | | | 363/21.12 |
| 2013/0288621 A1* | 10/2013 | Pennisi | H02J 50/20 |
| | | | 455/127.1 |
| 2015/0028163 A1* | 1/2015 | Hochman | B61L 27/53 |
| | | | 246/194 |
| 2015/0137706 A1* | 5/2015 | Nagashita | B60L 1/00 |
| | | | 315/307 |
| 2016/0359431 A1* | 12/2016 | Pennisi | H02J 50/10 |
| 2017/0346348 A1* | 11/2017 | Lethellier | H02J 7/00034 |
| 2018/0278168 A1* | 9/2018 | Brown | H02P 27/06 |
| 2019/0097534 A1* | 3/2019 | Schumacher | H02M 3/158 |

FOREIGN PATENT DOCUMENTS

| | | |
|---|---|---|
| CN | 102136809 A | 7/2011 |
| CN | 111619362 A | 9/2020 |
| CN | 112172536 A | 1/2021 |
| EP | 1492133 A1 | 12/2004 |
| JP | S5429414 A | 3/1979 |
| JP | S5579698 A | 6/1980 |
| JP | S58212303 A | 12/1983 |
| KR | 20170112503 A | 10/2017 |

OTHER PUBLICATIONS

International Search Report for PCT/CN2021/095375 mailed Aug. 26, 2021, ISA/CN.

* cited by examiner

VOLTAGE CONTROL METHOD AND APPARATUS, SYSTEM, AND MAGLEV TRAIN

This application is the national phase of International Application No. PCT/CN2021/095375, titled "VOLTAGE CONTROL METHOD AND APPARATUS, SYSTEM, AND MAGLEV TRAIN" filed on May 24, 2021, which claims priority to Chinese Patent Application No. 202011096586.8, titled "VOLTAGE CONTROL METHOD AND APPARATUS, SYSTEM, AND MAGLEV TRAIN", filed on Oct. 14, 2020 with the China National Intellectual Property Administration, both of which are incorporated herein by reference in their entireties.

FIELD

The present disclosure relates to the technical field of railway vehicles, in particular, to a voltage control method, apparatus, system, and maglev train.

BACKGROUND

When a maglev train is in operation, there is no direct contact between a bottom of the maglev train and a track, hence, the maglev train is not affected by frictional resistance during operation. The development of the maglev train is promising due to the advantages such as fast speed, low consumption, environment friendly, and safety, etc. An output transformer is a key device of a power system of the maglev train, which is used to transform an input voltage to provide power for the maglev train.

In a starting stage of the maglev train, a large output current is required to provide a large thrust and a relatively low voltage requirement is required, to ensure that the maglev train can complete a starting acceleration process with a large acceleration. During traveling of the maglev train, a back electromotive force generated by the vehicle will increase rapidly. In order to ensure the normal traveling of the maglev train, the power system requires a higher voltage. Therefore, the output transformer of the maglev train in the conventional technology has two sets of transformation ratios, using a lower transformation ratio in the starting stage and a higher transformation ratio in a train traveling stage.

However, in the conventional technology, only the starting acceleration stage and the train traveling stage are considered, and process of accelerating the maglev train from a lower speed to a higher speed after starting is not considered. Therefore, the two sets of transformation ratios of the existing output transformer cannot meet the actual requirements of the maglev train.

SUMMARY

In view of this, a voltage control method, apparatus, system, and maglev train are provided according to embodiments of the present disclosure, aimed at providing multiple sets of transformation ratios for the maglev train during a traveling acceleration stage of the maglev train, increasing the traction force of the maglev train, and improving operational efficiency.

In a first aspect, a voltage control method is provided according to embodiments of the present disclosure. The method is applied to a maglev train and includes:
acquiring a train traveling speed; and
determining, based on correspondences between train traveling speeds and transformation ratios, a target transformation ratio corresponding to the train traveling speed, the transformation ratio being a ratio of an input voltage to an output voltage and being used to control a transformer to transform the input voltage;
where the correspondences between train traveling speeds and transformation ratios is obtained based on correspondences between train traveling speeds and train traction forces at different transformation ratios.

In an embodiment, the correspondences between train traveling speeds and transformation ratios are obtained by:
acquiring a first relationship, the first relationship representing a relationship that a train traction force varied with a train traveling speed under a first condition, and the first condition including that a ratio of an input voltage to an output voltage is a first transformation ratio;
acquiring a second relationship, the second relationship representing a relationship that a train traction varied with a train traveling speed at a second condition, the second condition including that a ratio of an input voltage to an output voltage is a second transformation ratio, and the first transformation ratio being less than the second transformation ratio; and
determining a switching speed based on the first relationship and the second relationship, a train traction force corresponding to the switching speed at the first condition being equal to a train traction force corresponding to the switching speed at the second condition.

In an embodiment, the determining, based on correspondences between train traveling speeds and transformation ratios, a target transformation ratio corresponding to the train traveling speed includes:
determining whether the train traveling speed is greater than the switching speed;
determining, in a case that the train traveling speed is less than the switching speed, the first transformation ratio as the target transformation ratio; and
determining, in a case that the train traveling speed is greater than the switching speed, the second transformation ratio as the target transformation ratio.

In an embodiment, the method further includes:
determining a train traveling state of the maglev train based on the train traveling speed, the train traveling state including a starting acceleration state and a traveling acceleration state; and
determining, in a case that the train traveling state is the starting acceleration state, a third transformation ratio as the target transformation ratio, the third transformation ratio being less than the first transformation ratio.

In an embodiment, the determining a train traveling state based on the train traveling speed includes:
determining whether the train traveling speed is greater than a speed threshold;
in a case that the train traveling speed is less than the speed threshold, determining the maglev train is in the starting acceleration state; and
in a case that the train traveling speed is greater than the speed threshold, determining the maglev train is in the traveling acceleration state.

In a second aspect, a voltage control apparatus is provided according to embodiments of the present disclosure, the apparatus is applied to a maglev train and includes:
a speed acquisition module, configured to acquire a train traveling speed; and a ratio determination module, configured to determine a target transformation ratio corresponding to the train traveling speed based on correspondences between train traveling speeds and transformation ratios, the transformation ratio being a ratio of an input voltage to an output voltage and being used to control a transformer to transform the input voltage;

where the correspondences between train traveling speeds and transformation ratios are obtained by:

acquiring a first relationship, the first relationship representing a relationship that a train traction varied with a train traveling speed at a first condition, the first condition including that a ratio of an input voltage to an output voltage is a first transformation ratio;

acquiring a second relationship, the second relationship representing a relationship that a train traction varied with a train traveling speed at a second condition, the second condition including that a ratio of an input voltage to an output voltage is a second transformation ratio, and the first transformation ratio being less than the second transformation ratio; and determining a switching speed based on the first relationship and the second relationship, a train traction corresponding to the switching speed at the first condition being equal to a train traction corresponding to the switching speed at the second condition.

In an embodiment, the ratio determination module includes:

a judgement module, configured to determine whether the train traveling speed is greater than the switching speed;

a first determination module, configured to determine the first transformation ratio as the target transformation ratio in a case that the train traveling speed is less than the switching speed; and a second determination module, configured to determine the second transformation ratio as the target transformation ratio in a case that the train traveling speed is greater than the switching speed.

In an embodiment, the apparatus further includes:

a state determination module, configured to determine a train traveling state of the maglev train based on the train traveling speed, the train traveling state including a starting acceleration state and a traveling acceleration state; and a third determination module, configured to determine a third transformation ratio as the target transformation ratio in a case that the train traveling state is the starting acceleration state, the third transformation ratio being less than the first transformation ratio.

In an embodiment, the state determination module is configured to:

determine whether the train traveling speed is greater than a speed threshold;

in a case that the train traveling speed is less than the speed threshold, determine the maglev train is in the starting acceleration state; and in a case that the train traveling speed is greater than the speed threshold, determine the maglev train is in the traveling acceleration state.

In an embodiment, a maglev train includes a power system, a transformer and a controller, where the power system is configured to provide a traction force for the maglev train driven by a power current;

the transformer is configured to transform power supply current under control of the controller to obtain power current, a voltage of the power supply current is an input voltage, and a voltage of the power current is an output voltage; and the controller is configured to: acquire a train traveling speed, and determine a target transformation ratio corresponding to the train traveling speed based on correspondences between train traveling speeds and transformation ratios, wherein the transformation ratio is a ratio of an input voltage to an output voltage and is used to control a transformer to transform the input voltage, and the correspondences between train traveling speeds and transformation ratios are obtained based on correspondences between train traveling speeds and train traction forces at different transformation ratios.

In a third aspect, a voltage control system is provided according to embodiments of the present disclosure, the system includes a transformer and a controller, where the transformer is configured to transform power supply current under control of the controller to obtain power current, a voltage of the power supply current is an input voltage, a voltage of the power current is an output voltage, and the power current is configured to drive a power system to provide a traction force for a maglev train;

the controller is configured to: acquire a train traveling speed, and determine a target transformation ratio corresponding to the train traveling speed based on correspondences between train traveling speeds and transformation ratios, where the transformation ratio is a ratio of an input voltage to an output voltage and is used to control a transformer to transform the input voltage, and the correspondences between train traveling speeds and transformation ratios are obtained based on correspondences between train traveling speeds and train traction forces at different transformation ratios.

In a fourth aspect, a maglev train is provided according to the present disclosure, including a power system and the voltage control system according to the third aspect.

A voltage control method is provided according to embodiments of the present disclosure. A train traveling speed is acquired. A target transformation ratio corresponding to the train traveling speed is determined based on correspondences between train traveling speeds and transformation ratios. The transformation ratio is a ratio of an input voltage to an output voltage. The input voltage is transformed based on the target transformation ratio to obtain the output voltage. The output voltage is used for driving a maglev train to travel. The correspondences between train traveling speeds and transformation ratios are obtained based on correspondences between train traveling speeds and train traction forces at different transformation ratios. In this way, the most suitable transformation ratio can be provided based on the traveling speed of the maglev train, which increases the traction force of the maglev train and improve the operating efficiency. In addition, a corresponding apparatus and maglev train are further provided according to the present disclosure.

BRIEF DESCRIPTION OF THE DRAWINGS

In order to more clearly explain the technical solutions in embodiments of the present disclosure or in the conventional technology, the drawings used in the description of the embodiments or the conventional technology are briefly introduced hereinafter. It is apparent that the drawings in the following description illustrate only some embodiments of the present disclosure. Other drawings may be obtained by those skilled in the art without creative efforts based on the provided drawings.

FIG. 1 is a schematic structural diagram of a maglev train according to an embodiment of the present disclosure.

DETAILED DESCRIPTION

A maglev train may receive electric energy of an electric system through a pantograph arm to provide energy for a power system, and may also provide energy for the power system through a battery. Nevertheless, a voltage provided often cannot meet the requirements of train operation regardless through the electric system or the battery. For this reason, the power system of the maglev train is provided with a transformer to increase an input voltage.

According to the inventors' research, the maglev train generates a relatively large back electromotive force when traveling. This is because the maglev train realizes non-contact suspension and guidance between the train and the track through electromagnetic force, so the electromagnetic induction phenomenon will occur during the traveling process of the maglev train, resulting in the back electromotive force. According to the theory of electromagnetic induction, the faster the maglev train runs, the greater the back electromotive force generated.

The effective voltage value that can be utilized by the power system of the maglev train is related to the difference between the output voltage of the transformer and the back electromotive force. Hence, when the back electromotive force of the maglev increases, the effective voltage value obtained by the power system decreases, resulting in the inability of the train to obtain sufficient traction, reducing the operating efficiency of the train.

In the conventional technology, the different requirements of the maglev train during the start acceleration stage and the traveling acceleration stage are taken into account, and different transformer ratios for voltage transformation are applied when the maglev train is starting to accelerate and accelerates in traveling. However, the problem of the increased back electromotive force during the traveling acceleration of the maglev train is not considered. As the maximum traveling speed of the maglev becomes faster and faster, the speed range during the traveling acceleration stage becomes larger and larger. Obviously, the conventional transformer cannot meet the needs of the maglev train, leading to problems such as low traction, slow acceleration, and low operating efficiency of the conventional maglev train.

In order to provide a technical solution that is capable of adjusting the transformation ratio of a transformer based on the traveling speed, a voltage control method, apparatus and system, and a maglev train are provided according to embodiments of the present disclosure, which will be described in detail in conjunction with the drawings below.

Figure 1:
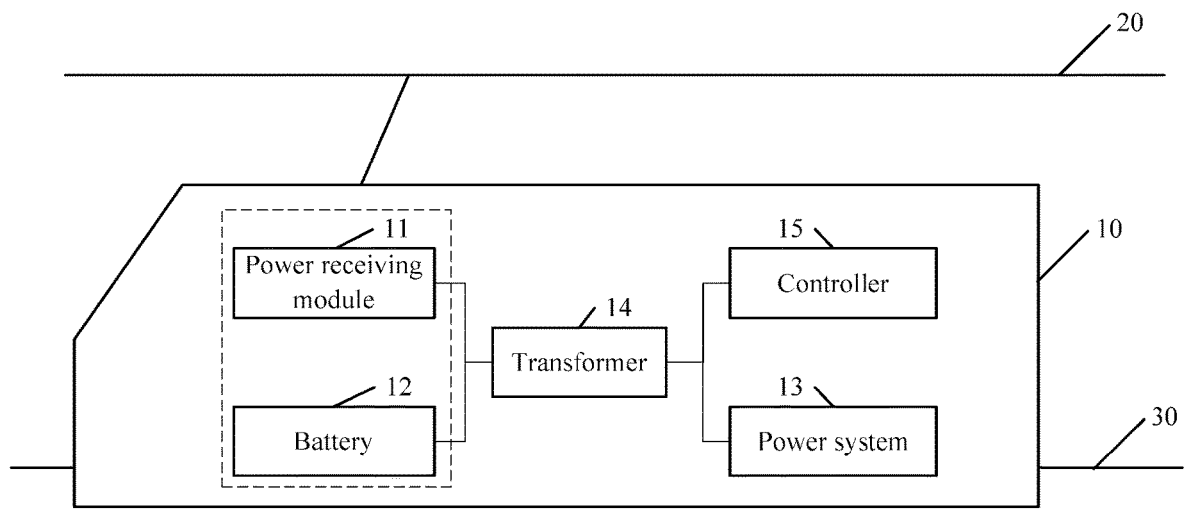

The maglev train according to embodiments of the present disclosure is first introduced. Referring to FIG. 1, FIG. 1 is a schematic structural diagram of a maglev train 10 according to an embodiment of the present disclosure, the maglev train 10 travels on a maglev track 30, and the maglev train 10 includes a power system 13, a transformer 14 and a controller 15.

The power system 13 is configured to provide a traction force for the maglev train 10 driven by a power current.

The transformer 14 is configured to transform power supply current under the control of the controller 15 to obtain power current, a voltage of the power supply current is an input voltage, and a voltage of the power current is an output voltage.

The controller 15 is configured to: acquire a train traveling speed, and determine a target transformation ratio corresponding to the train traveling speed based on correspondences between train traveling speeds and transformation ratios, where the transformation ratio is a ratio of an input voltage to an output voltage and is used to control a transformer 14 to transform the input voltage, and the correspondences between train traveling speeds and transformation ratios are obtained based on correspondences between train traveling speeds and train traction forces at different transformation ratios.

The power current may be provided by a battery 12, or acquired by a power receiving module 11 from a power supply system 20. An input voltage of the transformer 14 is a voltage of the power supply system 20 or a voltage of the battery 12. In an embodiment of the present disclosure, the maglev train 10 may acquire the power source through the power receiving module 11, or may acquire the power source from the battery 12. In one example, the maglev train 10 may be provided with both the power receiving module 11 and the battery 12. The transformer 14 may be a transformer with multiple taps, where each tap corresponds to a transformation ratio. Alternative, the transformer 14 may be a transformer group including multiple transformers, and transformation ratios of different transformers are different. The controller 15 may be a central processing unit (CPU), or other devices with data processing functions, or a software function module in other control systems. In one example, the controller 15 may be a software module in the train control system dedicated to controlling the transformer.

When the maglev train is traveling, the controller 15 may first acquire the train traveling speed, and determine the target transformation ratio corresponding to the current traveling speed of the maglev train based on correspondence relationship between train traveling speeds and transformation ratios, thereby controlling the transformer 14 to adjust the output voltage based on the target transformation ratio, so as to provide energy for the power system 13 and ensure the maglev train to travel normally. The controller 15 may acquire the train traveling speed through a sensor 16 (not shown in FIG. 1), or acquire the train traveling speed from other systems through a train communication bus. The correspondences between train traveling speeds and transformation ratios are obtained in advance based on correspondences between train traveling speeds and train traction forces at different transformation ratios. In one example, the correspondence between train traveling speeds and transformation ratios may be pre-stored in a memory 17 (not shown in FIG. 1). During determination, the controller 15 may acquire the correspondences between the train traveling speeds and the transformation ratios from the memory 17.

The above describes the maglev train provided by the embodiment of the present disclosure. A voltage control method, from the perspective of the controller of the maglev train (i.e., the controller 15 shown in FIG. 1), provided according to the present disclosure will be described in detail.

Figure 2:
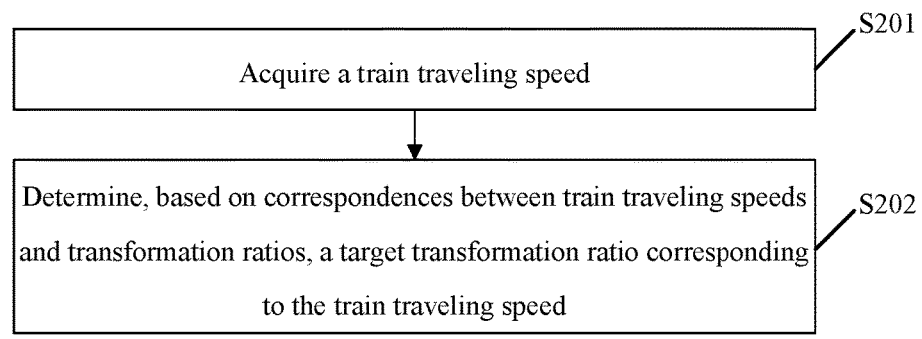
FIG. 2 is a flow chart of a voltage control method according to an embodiment of the present disclosure.

Referring to FIG. 2, FIG. 2 is a flow chart of a voltage control method according to an embodiment of the present disclosure, the voltage control method includes the following steps.

In S201, a train traveling speed is acquired.

In the embodiment of the present disclosure, the controller may first acquire the train traveling speed, that is, the traveling speed of the maglev train at the current moment. For example, the controller may acquire the train traveling speed through a speed sensor, or acquire the train traveling speed through a navigation system such as GPS (Global Positioning System). In an example, the controller may also acquire the train traveling speed from other systems of the maglev train (such as the navigation system of the maglev train) through the communication bus of the maglev train.

In S202, a target transformation ratio corresponding to the train traveling speed is determined based on correspondences between train traveling speeds and transformation ratios.

After acquiring the train traveling speed, the controller may determine the target transformation ratio corresponding to the current traveling speed of the maglev train based on the correspondences between train traveling speeds and transformation ratios of the maglev train. The correspondences between train traveling speeds and transformation ratios indicate that the maximum traction force can be obtained by the maglev train at different traveling speeds, which are obtained based on correspondences between train traveling speeds and train traction forces at different transformation ratios.

The specific method for acquiring the correspondence relationship between train traveling speeds and transformation ratios is introduced below.

Before determining the correspondences between train traveling speeds and transformation ratios, the traction characteristics of the train under different transformation ratios may be tested first, that is, the relationship between the traction forces and the speeds of the train under a fixed transformation ratio, may be tested. Specifically, firstly, the transformation ratio of the transformer may be adjusted to a first transformation ratio, and then the train is controlled to accelerate from stop under the premise of maintaining the first transformation ratio. The relationship between the train traction force and the speed during the acceleration process is obtained and recorded as a first relationship. Then, the transformation ratio of the transformer may be adjusted from the first transformation ratio to a second transformation ratio, and the train is controlled to accelerate from stop under the premise of maintaining the second transformation ratio. The relationship between the train traction force and the speed during the acceleration process is obtained and recorded as a second relationship. The second transformation ratio may be any transformation ratio different from the first transformation ratio. For the convenience of subsequent introduction, in the embodiment of the present disclosure, the first transformation ratio is less than the second transformation ratio.

The acquiring the first relationship and the second relationship may further restrict other conditions of the train, such as the mass of the train body and the like. In this embodiment of the present disclosure, the restriction condition for determining the first relationship may be used as a first condition, and the restriction condition for determining the second relationship may be used as a second condition. The first condition includes a first transformation ratio, and the second condition includes a second transformation ratio.

After the first relationship and the second relationship are obtained through the simulation test or the actual vehicle test, the first relationship and the second relationship may be compared. Then, the speed at which the traction force of the train is the same under the first condition and the second condition may be acquired as the switching speed. That is, when the train is traveling at the switching speed, the train obtains the same traction force under the first condition and under the second condition. Since the first transformation ratio is less than the second transformation ratio, the output voltage obtained by the transformer transformed by the first transformation ratio is less than the output voltage obtained by the transformer by the second transformation ratio. The faster the maglev train travels, the higher the back electromotive force generated and the higher the voltage required. Therefore, when the maglev train is traveling at a low speed, the first transformation ratio may be used for transformation, thereby obtaining a relatively low output voltage. When the maglev train is traveling at a high speed, the second transformation ratio may be used, thereby obtaining a relatively high output voltage. Thus, the influence of the back electromotive force is overcome.

In this way, the obtained correspondences between the train traveling speeds and the transformation ratios are as follows: in a case that the train traveling speed is lower than the switching speed, the corresponding transformation ratio is the first transformation ratio; in a case that the train traveling speed is higher than the switching speed, the corresponding transformation ratio is the second transformation ratio. It is apparent that, a similar method may be used to determine the correspondences between the transformation ratios and the train traveling speeds, in a case that the transformation ratio further includes a third transformation ratio or even more transformation ratios.

In the embodiment of the present disclosure, the correspondences between the train traveling speeds and the transformation ratios may be pre-stored in the local memory of the maglev train, or may be stored in the cloud memory. The controller may acquire the correspondences between the train traveling speeds and the transformation ratios, and determine the target transformation ratio corresponding to the current train traveling speed of the train.

Specifically, the controller may determine whether the current traveling speed of the train is greater than the switching speed. In a case that the train traveling speed is lower than the switching speed, the first transformation ratio is determined as the target transformation ratio. In a case that the train traveling speed is greater than the switching speed, the second transformation ratio is determined as the target transformation ratio. In this way, the most suitable transformer ratio of the train can be selected based on the actual traveling speed of the train, so as to ensure that the train can operate under the maximum traction force, thereby increasing the acceleration of the train and improving the operating efficiency.

In this embodiment of the present disclosure, the controller may also first determine whether the train is in a traveling acceleration state or a starting acceleration state based on the traveling speed of the train. In a case that the train is in the traveling acceleration state, the controller may use the method of step S202 to determine the target transformation ratio. In a case that the train is in the starting acceleration state, the controller may directly use the third transformation ratio as the target transformation ratio, where the third transformation ratio is less than the first transformation ratio. In this way, the output voltage provided by the transformer is relatively small during the starting acceleration stage of the train. Under the condition of constant power, using the third transformation ratio to transform the voltage can provide a larger current for the power system, thereby increasing the acceleration of the maglev train in the starting acceleration stage and improving the operating efficiency.

In one example, the controller may read a speed threshold from the memory, and determine whether the train traveling speed is greater than the speed threshold. In a case that the train traveling speed is less than the speed threshold, determining the train is in the starting acceleration state; and in a case that the train traveling speed is greater than the speed threshold, determining the train is in the traveling acceleration state.

According to the present disclosure, a voltage control method is provided. A train traveling speed is acquired. A target transformation ratio corresponding to the train traveling speed is determined based on correspondences between train traveling speeds and transformation ratios. The transformation ratio is a ratio of an input voltage to an output voltage. The input voltage is transformed based on the target transformation ratio to obtain the output voltage. The output voltage is used for driving a maglev train to travel. The correspondences between train traveling speeds and transformation ratios are obtained based on correspondences between train traveling speeds and train traction forces at different transformation ratios. In this way, the most suitable transformation ratio can be provided based on the traveling speed of the maglev train, which increases the traction force of the maglev train and improve the operating efficiency.

Specific implementation manners of the voltage control method in the embodiments of the present disclosure have been provided. Based on the above, a corresponding voltage control apparatus is also provided according to the present disclosure. According to the present disclosure, the apparatus will be introduced from the perspective of functional modularization below.

Figure 3:
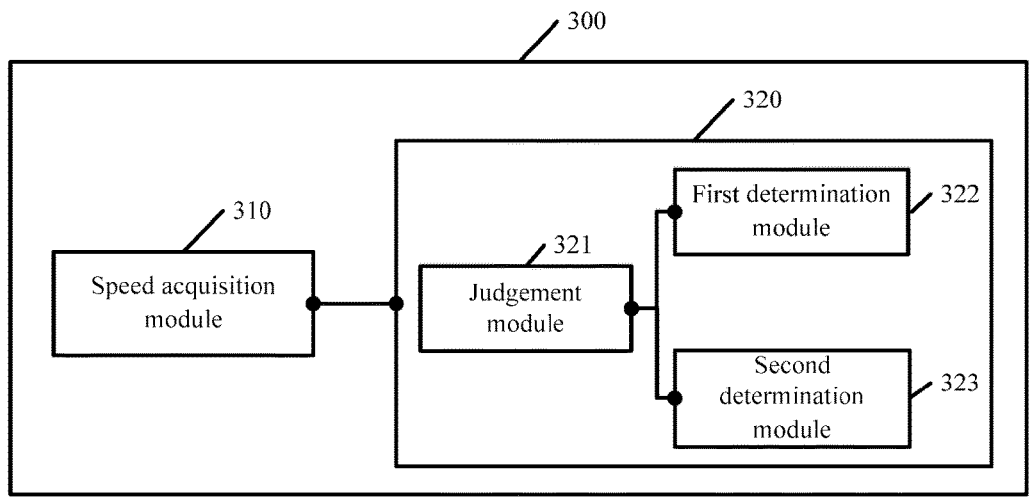
FIG. 3 is a schematic structural diagram of a voltage control apparatus according to an embodiment of the present disclosure.

Referring to FIG. 3, FIG. 3 is a schematic structural diagram of a voltage control apparatus according to an embodiment of the present disclosure, the apparatus 300 includes: a speed acquisition module 310 and a ratio determination module 320.

The speed acquisition module 310 is configured to acquire a train traveling speed.

The ratio determination module 320 is configured to determine a target transformation ratio corresponding to the train traveling speed based on correspondences between train traveling speeds and transformation ratios, where the transformation ratio is a ratio of an input voltage to an output voltage and is used to control a transformer to transform the input voltage.

The correspondences between train traveling speeds and transformation ratios are obtained by:
  acquiring a first relationship, where the first relationship represents a relationship that a train traction force varied with a train traveling speed at a first condition, and the first condition includes that a ratio of an input voltage to an output voltage is a first transformation ratio;
  acquiring a second relationship, where the second relationship represents a relationship that a train traction force varied with a train traveling speed at a second condition, the second condition includes that a ratio of an input voltage to an output voltage is a second transformation ratio, and the first transformation ratio is less than the second transformation ratio; and
  determining a switching speed based on the first relationship and the second relationship, where a train traction corresponding to the switching speed at the first condition is equal to a train traction corresponding to the switching speed at the second condition.

According to the present disclosure, a voltage control apparatus is provided. A train traveling speed is acquired. A target transformation ratio corresponding to the train traveling speed is determined based on correspondences between train traveling speeds and transformation ratios. The transformation ratio is a ratio of an input voltage to an output voltage. The input voltage is transformed based on the target transformation ratio to obtain the output voltage. The output voltage is used for driving a maglev train to travel. The correspondences between train traveling speeds and transformation ratios are obtained based on correspondences between train traveling speeds and train traction forces at different transformation ratios. In this way, the most suitable transformation ratio can be provided based on the traveling speed of the maglev train, which increases the traction force of the maglev train and improve the operating efficiency.

Figure 4:
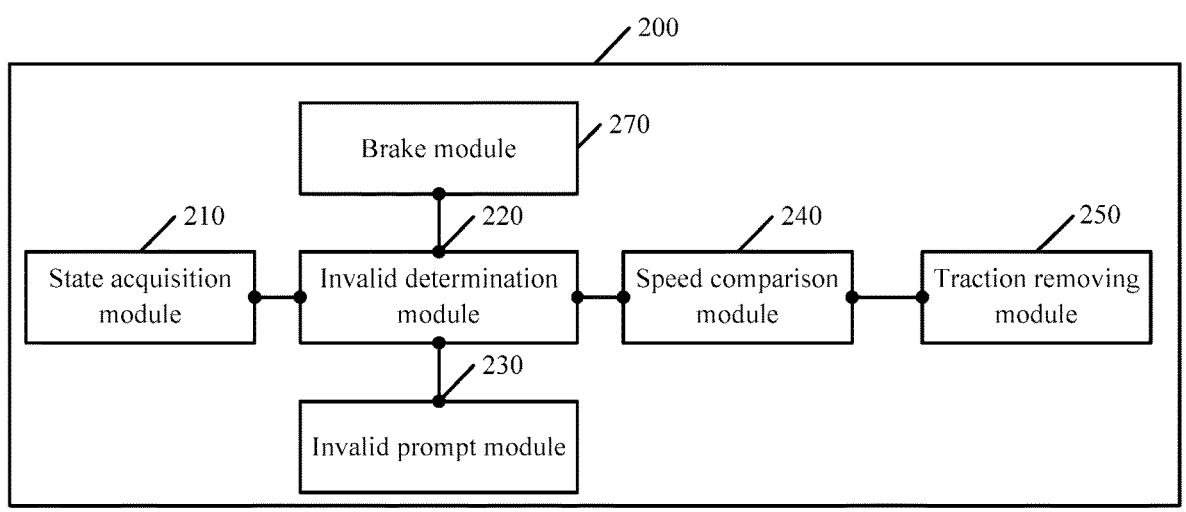
FIG. 4 is a schematic structural diagram of a voltage control apparatus according to another embodiment of the present disclosure.

In an embodiment, as shown in FIG. 4, based on the voltage control apparatus shown in FIG. 3, the ratio determination module 320 includes a judgement module 321, a first determination module 322 and a second determination module 323.

The judgement module 321 is configured to determine whether the train traveling speed is greater than the switching speed.

The first determination module 322 is configured to determine the first transformation ratio as the target transformation ratio in a case that the train traveling speed is less than the switching speed.

The second determination module 323 is configured to determine the second transformation ratio as the target transformation ratio in a case that the train traveling speed is greater than the switching speed.

In this way, the most suitable transformation ratio for the train can be selected based on the actual traveling speed of the train, so that the train can travel under the maximum traction force, thereby increasing the acceleration of the train and improving the operating efficiency.

Figure 5:
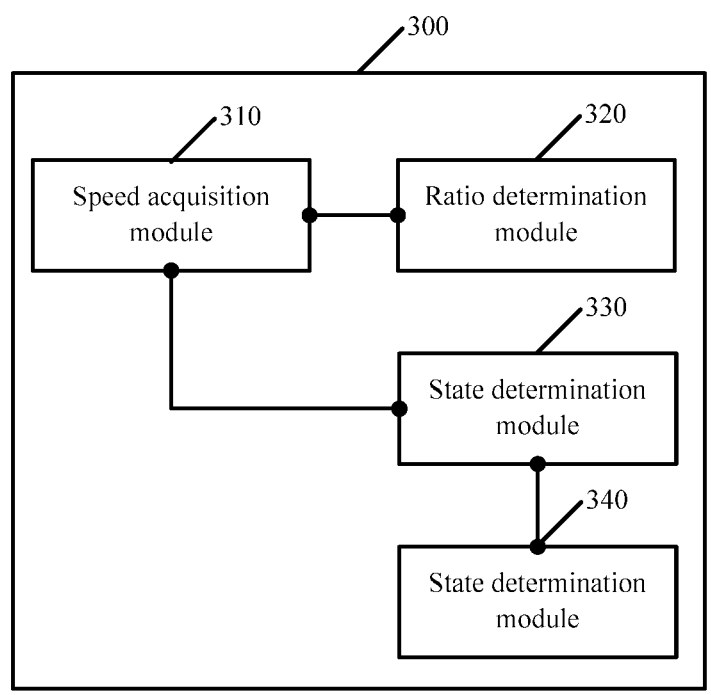
FIG. 5 is a schematic structural diagram of a voltage control apparatus according to another embodiment of the present disclosure.

In an embodiment, as shown in FIG. 5, based on the voltage control apparatus shown in FIG. 3, the apparatus 300 includes a state determination module 330 and a third determination module 340.

The state determination module 330 is configured to determine a train traveling state of the train based on the train traveling speed, where the train traveling state includes a starting acceleration state and a traveling acceleration state.

The third determination module 340 is configured to determine a third transformation ratio as the target transformation ratio in a case that the train traveling state is the starting acceleration state, where the third transformation ratio is less than the first transformation ratio.

In this way, under the condition of constant power, a larger current for the power system is provided by using the third transformation ratio to transform the voltage, thereby increasing the acceleration of the maglev train in the starting acceleration stage and improving the operating efficiency.

In a possible implementation manner, the state determination module 340 is configured to: determine whether the train traveling speed is greater than a speed threshold; in a case that the train traveling speed is less than the speed threshold, determine the train is in the starting acceleration state; and in a case that the train traveling speed is greater than the speed threshold, determine the train is in the traveling acceleration state.

In addition, a voltage control system is provided according to the embodiment of the present disclosure, the system includes a transformer and a controller.

The transformer is configured to transform power supply current under control of the controller to obtain power current, a voltage of the power supply current is an input voltage, a voltage of the power current is an output voltage, and the power current is configured to drive a power system to provide a traction force for a maglev train.

The controller is configured to: acquire a train traveling speed, and determine a target transformation ratio corresponding to the train traveling speed based on correspondences between train traveling speeds and transformation ratios, where the transformation ratio is a ratio of an input voltage to an output voltage and is used to control a transformer to transform the input voltage, and the correspondences between train traveling speeds and transformation ratios are obtained based on correspondences between train traveling speeds and train traction forces at different transformation ratios Further, the controller may perform the voltage control method according to any one of the embodiments of the present disclosure, which will not be repeated here.

A maglev train is also provided according to the embodiments of the present disclosure, the maglev train includes a power system and the above-mentioned voltage control system.

The "first" and "second" in the terms of "first transformation ratio" and "second transformation ratio" mentioned in the embodiments of the present disclosure are only used for name identification, which do not represent a first and a second in order.

From the above description of the implementation manners, it can be seen that those skilled in the art can clearly understand that all or part of the steps in the methods of the above embodiments may be implemented by means of the software plus general hardware platform. Based on this understanding, the technical solutions of the present disclosure may be embodied in the form of software products, and the computer software products may be stored in storage media, such as Read-Only Memory (ROM)/RAM, disk, CDs, etc., include several instructions to make a computer device (which may be a personal computer, a server, or a network communication device such as a router) implement the methods described in various embodiments or some parts of the embodiments of the present disclosure.

Each embodiment in this specification is described in a progressive manner, the same and similar parts of each embodiment can be referred to each other, and each embodiment focuses on the differences from other embodiments. In particular, for the apparatus embodiments, since it is basically similar to the method embodiments, the description is relatively simple, and the related parts can refer to the part of the description of the method embodiments. Part or all of the modules may be selected according to practical needs to achieve the purpose of the solution of the embodiments. It can be understood and implemented by those skilled in the art without creative efforts.

The above descriptions are only exemplary implementations of the present disclosure, which are not intended to limit the protection scope of the present disclosure.

The invention claimed is:

1. A voltage control method, applied to a maglev train, comprising:
    acquiring a train traveling speed; and
    determining, based on correspondences between train traveling speeds and transformation ratios, a target transformation ratio corresponding to the train traveling speed, the transformation ratio being a ratio of an input voltage to an output voltage and being used to control a transformer to transform the input voltage;
    wherein the correspondences between train traveling speeds and transformation ratios are obtained based on correspondences between train traveling speeds and train traction forces at different transformation ratios.

2. The method according to claim 1, wherein the obtaining the correspondences between train traveling speeds and transformation ratios comprising:
    acquiring a first relationship, the first relationship representing a relationship that a train traction force varied with a train traveling speed under a first condition, and the first condition comprising that a ratio of an input voltage to an output voltage is a first transformation ratio;
    acquiring a second relationship, the second relationship representing a relationship that a train traction varied with a train traveling speed at a second condition, the second condition comprising that a ratio of an input voltage to an output voltage is a second transformation ratio, and the first transformation ratio being less than the second transformation ratio; and
    determining a switching speed based on the first relationship and the second relationship, a train traction force corresponding to the switching speed at the first condition being equal to a train traction force corresponding to the switching speed at the second condition.

3. The method according to claim 2, wherein the determining, based on correspondences between train traveling speeds and transformation ratios, a target transformation ratio corresponding to the train traveling speed comprises:
    determining whether the train traveling speed is greater than the switching speed;
    determining, in a case that the train traveling speed is less than the switching speed, the first transformation ratio as the target transformation ratio; and
    determining, in a case that the train traveling speed is greater than the switching speed, the second transformation ratio as the target transformation ratio.

4. The method according to claim 1, wherein the method further comprises:
    determining a train traveling state of the maglev train based on the train traveling speed, the train traveling state comprising a starting acceleration state or a traveling acceleration state; and
    determining, in a case that the train traveling state is the starting acceleration state, a third transformation ratio as the target transformation ratio, the third transformation ratio being less than the first transformation ratio.

5. The method according to claim 4, wherein the determining a train traveling state based on the train traveling speed comprises:
    determining whether the train traveling speed is greater than a speed threshold;
    in a case that the train traveling speed is less than the speed threshold, determining the maglev train is in the starting acceleration state; and in a case that the train traveling speed is greater than the speed threshold, determining the maglev train is in the traveling acceleration state.

6. A voltage control system, comprising a transformer and a controller, wherein
the transformer is configured to transform power supply current under control of the controller to obtain power current, a voltage of the power supply current is an input voltage, a voltage of the power current is an output voltage, and the power current is configured to drive a power system to provide a traction force for a maglev train; and
the controller is configured to: acquire a train traveling speed, and determine a target transformation ratio corresponding to the train traveling speed based on correspondences between train traveling speeds and transformation ratios, wherein the transformation ratio is a ratio of an input voltage to an output voltage and is used to control a transformer to transform the input voltage, and the correspondences between train traveling speeds and transformation ratios are obtained based on correspondences between train traveling speeds and train traction forces at different transformation ratios.

7. The voltage control system according to claim 6, wherein the controller is further configured to:
acquire a first relationship, the first relationship representing a relationship that a train traction force varied with a train traveling speed under a first condition, and the first condition comprising that a ratio of an input voltage to an output voltage is a first transformation ratio;
acquire a second relationship, the second relationship representing a relationship that a train traction varied with a train traveling speed at a second condition, the second condition comprising that a ratio of an input voltage to an output voltage is a second transformation ratio, and the first transformation ratio being less than the second transformation ratio; and
determine a switching speed based on the first relationship and the second relationship, a train traction force corresponding to the switching speed at the first condition being equal to a train traction force corresponding to the switching speed at the second condition.

8. The voltage control system according to claim 7, wherein the controller is further configured to:
determine whether the train traveling speed is greater than the switching speed;
determine, in a case that the train traveling speed is less than the switching speed, the first transformation ratio as the target transformation ratio; and
determine, in a case that the train traveling speed is greater than the switching speed, the second transformation ratio as the target transformation ratio.

9. The voltage control system according to claim 6, wherein the controller is further configured to:
determine a train traveling state of the maglev train based on the train traveling speed, the train traveling state comprising a starting acceleration state or a traveling acceleration state; and
determine, in a case that the train traveling state is the starting acceleration state, a third transformation ratio as the target transformation ratio, the third transformation ratio being less than the first transformation ratio.

10. The voltage control system according to claim 9, wherein the controller is further configured to:
determining whether the train traveling speed is greater than a speed threshold;
in a case that the train traveling speed is less than the speed threshold, determining the maglev train is in the starting acceleration state; and
in a case that the train traveling speed is greater than the speed threshold, determining the maglev train is in the traveling acceleration state.

11. A maglev train, comprising a power system and a voltage control system, wherein
the voltage control system comprises a transformer and a controller;
the transformer is configured to transform power supply current under control of the controller to obtain power current, a voltage of the power supply current is an input voltage, a voltage of the power current is an output voltage, and the power current is configured to drive a power system to provide a traction force for a maglev train; and
the controller is configured to: acquire a train traveling speed, and determine a target transformation ratio corresponding to the train traveling speed based on correspondences between train traveling speeds and transformation ratios, wherein the transformation ratio is a ratio of an input voltage to an output voltage and is used to control a transformer to transform the input voltage, and the correspondences between train traveling speeds and transformation ratios are obtained based on correspondences between train traveling speeds and train traction forces at different transformation ratios.

* * * * *